(12) United States Patent
Wang et al.

(10) Patent No.: US 7,580,579 B2
(45) Date of Patent: Aug. 25, 2009

(54) IMAGE-ADAPTIVE QUANTIZATION FOR JPEG COMPRESSION

(75) Inventors: Yu-Wei Wang, Fort Collins, CO (US); Casey L. Miller, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 912 days.

(21) Appl. No.: 11/018,206

(22) Filed: Dec. 20, 2004

(65) Prior Publication Data

US 2006/0133685 A1 Jun. 22, 2006

(51) Int. Cl.
*G06K 9/36* (2006.01)
(52) U.S. Cl. .............. 382/232; 382/250; 382/251; 382/262; 375/240.12
(58) Field of Classification Search ............... 382/262, 382/166, 167, 232, 233, 236, 239, 240, 250, 382/251, 253; 375/240.12, 240.16, 240.01
See application file for complete search history.

(56) References Cited

U.S. PATENT DOCUMENTS

| 4,516,258 | A |   | 5/1985 | Ching et al. |
| 5,263,100 | A | * | 11/1993 | Kim et al. .................... 382/166 |
| 5,668,646 | A | * | 9/1997 | Katayama et al. ............ 358/530 |
| 5,727,089 | A | * | 3/1998 | Ray et al. .................... 382/240 |
| 6,310,973 | B1 | * | 10/2001 | Persiantsev et al. ......... 382/232 |
| 6,597,815 | B1 | * | 7/2003 | Satoh et al. ................. 382/251 |
| 6,757,439 | B2 | * | 6/2004 | Leeder et al. ............... 382/246 |
| 2005/0053281 | A1 | * | 3/2005 | Frazer ........................ 382/168 |

OTHER PUBLICATIONS

Rosenholtz, Ruth, "Perceptual Adaptive JPEG Coding", IEEE International Conference on Image Processing, Lausanne, Switzerland, vol. 2, pp. 901-904 (1996).

* cited by examiner

*Primary Examiner*—Samie A. Ahmed
*Assistant Examiner*—Ali Bayat (57) ABSTRACT

In a method of digital image compression, the spatial frequency content of a digital image is characterized using a relatively sparse sampling of data blocks from the image, and a quantization table is constructed based on the characterization of the spatial frequency content.

37 Claims, 6 Drawing Sheets

IMAGE-ADAPTIVE QUANTIZATION FOR JPEG COMPRESSION

FIELD OF THE INVENTION

The present invention relates to digital image compression.

BACKGROUND OF THE INVENTION

One commonly-used technique for compressing digital images is the JPEG technique, named for the Joint Photographic Experts Group (JPEG), the committee that developed the specifications for standard use of the technique and for the standard storage format of JPEG image files. The JPEG technique is "lossy". That is, an image that has been compressed by the JPEG technique and then reconstituted is not identical to the original, uncompressed image.

The JPEG technique is also configurable. A user of the technique can choose a higher compression ratio at the expense of more image distortion, or a higher image quality at the expense of a larger image file. A camera, image editing program, or other digital imaging device may provide a user control for controlling the tradeoff between file size and image quality. For example, a camera may allow the user to select a "1 star", "2 star", or "3 star" image quality, or an image editing program may allow quality settings ranging from one (least image quality, smallest file) to 10 (highest image quality, largest file).

This tradeoff is generally accomplished by using a different quantization table for each quality setting. For example, in a camera with three image quality settings, three different tables may be provided, one table always used when the first quality setting is selected, a second table always used when the second quality setting is selected, and a third table always used when the third quality setting is selected. However, two images compressed using these "hard coded" tables may appear to a user to be of significantly different perceived quality. Furthermore, such tables seldom produce an image file of the minimum size for a particular level of perceived image quality.

DETAILED DESCRIPTION

A summary of some of the steps involved in performing JPEG compression will be helpful in understanding the invention. The sequence of steps involved in constructing a JPEG-compressed file from a digital image comprises:

0. Color space conversion, if necessary
1. Constructing macroblocks
2. Performing a Discrete Cosine Transform (DCT)
3. Quantization
4. "Zig zag" ordering and coding of the quantized coefficients The steps need not be performed in the exact order given; some variation is possible.

Many digital imaging devices capture digital images in "RGB" format. A digital image is an ordered array of numerical values that represent the brightness or color or both of corresponding locations in a scene or picture. In the RGB format, each "pixel", or picture element, of the image comprises three numerical values, one each indicating the contribution of red (R), green (G), and blue (B) components to the overall color and brightness of the pixel. Other devices may capture digital images in other formats. The JPEG technique operates on images in the YCrCb format. If necessary, the digital image being compressed is converted to the YCrCb format in the color space conversion step. In the YCrCb color space, each pixel is described by its overall brightness or luminance (Y), and two chrominance values (Cr and Cb) that describe the color of the pixel. Methods for converting a digital image to YCrCb format are known in the art.

Figure 1:
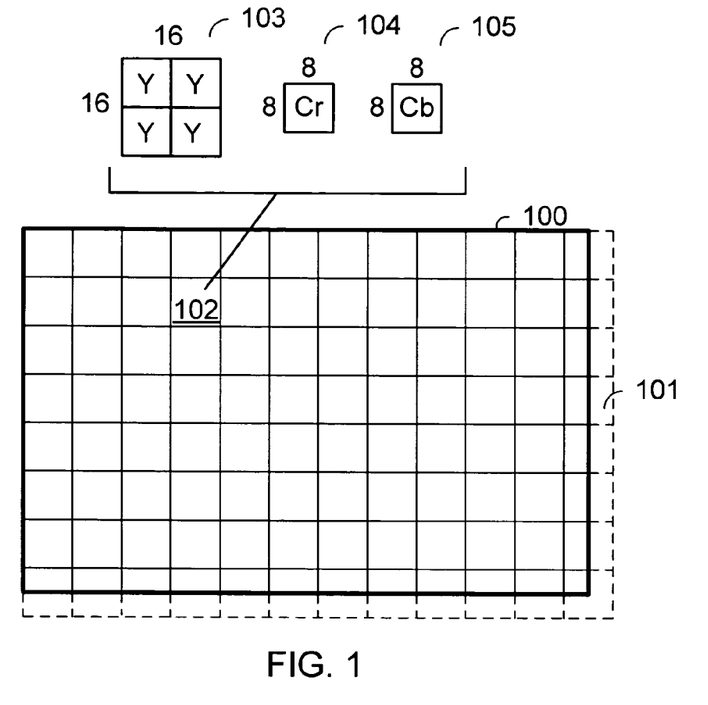
FIG. 1 shows a sample digital image divided into macroblocks.

The digital image in YCrCb format is conceptually divided into macroblocks. FIG. 1 shows a sample digital image 100 divided into 96 macroblocks. A macroblock encompasses a square subset of the digital image, 16 pixels on a side. Each pixel in the digital image resides in only one macroblock. If the digital image width or height is not a multiple of 16 pixels, the image is padded appropriately with temporary data so that each dimension is a multiple of 16 pixels. Example digital image 100 is 184 pixels in width and 120 pixels in height. Neither dimension is a multiple of 16 pixels, so several peripheral macroblocks, such as macroblock 101, have been padded with temporary data. Macroblock 102 in example image 100 has been expanded to show the contents of a macroblock. In this example, each macroblock comprises six data blocks, each data block being an 8 pixel by 8 pixel (8×8) array of numerical values. Four data blocks 103 comprise the numerical luminance (Y) data from the macroblock, one data block for each quadrants of the macroblock. The fifth data block 104 holds an 8×8 array of numerical values representing the first chrominance channel (Cr) data from the macroblock, but scaled to a lower resolution than the original digital image. The sixth data block 105 holds an 8×8 array of numerical values representing the second chrominance channel (Cb) data of the macroblock, also scaled to the lower resolution.

Note that the division of an image into macroblocks may be conceptual. The image need not be stored in a computer or other digital imaging device in the exact rectangular format shown in FIG. 1.

Other macroblock configurations are possible as well. The example given above assumes "4:2:0" data compression for the chrominance channels, which results in six data blocks for each macroblock. Another data compression format called "4:2:2" results in eight data blocks for each macroblock —four luminance data blocks and two chrominance data blocks for each chrominance channel. Similarly, "4:4:4" compression results in 12 data blocks for each macroblock— four for each luminance and chrominance channel. One of skill in the art will recognize that the appended claims encompass practicing the invention with these and other compression formats.

Each data block, whether representing luminance or chrominance information, is an 8×8 array of numerical values. For example, an array of luminance data in a single data block of image 100 may be:

| Array (1), Example Luminance Data | | | | | | | |
|---|---|---|---|---|---|---|---|
| 102 | 100 | 101 | 101 | 104 | 104 | 122 | 137 |
| 102 | 100 | 100 | 101 | 104 | 108 | 121 | 132 |
| 104 | 102 | 101 | 101 | 105 | 106 | 123 | 135 |
| 107 | 105 | 103 | 99 | 107 | 109 | 123 | 134 |
| 110 | 105 | 104 | 104 | 109 | 110 | 126 | 138 |
| 112 | 109 | 107 | 97 | 111 | 113 | 129 | 139 |
| 114 | 102 | 113 | 112 | 122 | 121 | 136 | 153 |
| 124 | 118 | 124 | 124 | 140 | 151 | 164 | 181 |

This example array of luminance data will be used below to illustrate the following steps. One of ordinary skill in the art will recognize that the steps apply to both luminance and chrominance data, and that no loss of generality is intended or created by using a single example array.

For each 8×8 data block in the image, a two-dimensional discrete cosine transform (DCT) is performed. The DCT is known in the art, and is described in *MPEG Video Compression Standard*, edited by Joan L. Mitchell, William B. Pennebaker, Chad E. Fogg, and Didier J. LeGall, and published by Chapman & Hall, ISBN 0-412-08771-5. The DCT of an 8×8 data block creates 8×8 array of coefficients. The DCT of the example array above is:

| Array (2), DCT of Array (1) | | | | | | | |
|---|---|---|---|---|---|---|---|
| 928.12 | −86.29 | 53.66 | −15.12 | 13.12 | −3.35 | 1.18 | 11.27 |
| −64.23 | 18.27 | −2.00 | −5.23 | −1.06 | 1.39 | −5.46 | −4.22 |
| 36.50 | −18.85 | −1.66 | −1.36 | 2.67 | .89 | 3.53 | −.37 |
| −25.06 | 11.06 | 1.78 | −1.51 | .19 | −.14 | −1.19 | 2.27 |
| 19.38 | −6.59 | 1.41 | .14 | −.13 | −.72 | −.18 | −1.64 |
| −11.01 | 3.31 | −.84 | −2.72 | 2.88 | .39 | .76 | 2.63 |
| 6.12 | −1.25 | 4.78 | .60 | −3.68 | −2.55 | −1.84 | .77 |
| −1.07 | −1.29 | −1.92 | −3.46 | 5.36 | 3.18 | −.24 | −.65 |

The upper left DCT coefficient indicates a scaled average value of the input data array, and is sometimes called the "DC" coefficient. In general, the other coefficients represent the spatial frequency content of the image, with higher frequency components at the lower right of the array. These other 63 coefficients are sometimes called the "AC" coefficients.

The next step in JPEG compression is to "quantize" the array of DCT coefficients. Quantization is performed by an element-by-element division by another array of quantizing values, and rounding the results. An example array of quantizing values, or quantization table, is:

| Array (3), Example Quantization Table | | | | | | | |
|---|---|---|---|---|---|---|---|
| 8 | 16 | 19 | 22 | 26 | 27 | 29 | 34 |
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

Using array (3) to quantize the array (2) of DCT coefficients above (by performing a point-by-point division and rounding the results to integer values) gives these quantized coefficients:

| Array (4), Array (2) Quantized by Array (3) | | | | | | | |
|---|---|---|---|---|---|---|---|
| 116 | −5 | 2 | 0 | 0 | 0 | 0 | 0 |
| −4 | 1 | 0 | 0 | 0 | 0 | 0 | 0 |
| 1 | 0 | 0 | 0 | 0 | 0 | 0 | 0 |
| −1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

In this example, the quantization step has reduced the 64-element data block to seven non-zero values and 57 zeros. In the subsequent steps, these quantized coefficients are placed in a "zig zag" order that tends to group the zeros together for efficient coding, and then the coefficients are coded very compactly for storage. Methods for performing these steps are known in the art, and not pertinent to the understanding of the present invention.

To reconstitute, or "decompress" the image, the steps described above are preformed in generally reverse order. The quantized coefficients are read from storage, and are recovered exactly. In the example above, array (4) above is recovered. The array of quantized coefficients is then multiplied point-by-point by the table of quantizing coefficients that was used to perform the quantization. Multiplying example arrays (3) and (4), an array of DCT coefficients is recovered as follows:

| Array (5), Recovered DCT Coefficients | | | | | | | |
|---|---|---|---|---|---|---|---|
| 928.00 | −80.00 | 38.00 | 0.00 | 0.00 | 0.00 | 0.00 | 0.00 |
| −64.00 | 16.00 | 0.00 | 0.00 | 0.00 | 0.00 | 0.00 | 0.00 |
| 19.00 | 0.00 | 0.00 | 0.00 | 0.00 | 0.00 | 0.00 | 0.00 |
| −22.00 | 0.00 | 0.00 | 0.00 | 0.00 | 0.00 | 0.00 | 0.00 |
| 0.00 | 0.59 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |

This array of recovered DCT coefficients corresponds to the original set of DCT coefficients in array (2) above. Array (5) approximates array (2), but the quantization has introduced differences in the two arrays. These differences propagate to the recovered image when an inverse DCT is performed on the recovered DCT coefficients. The inverse DCT of array (5) above, rounded to integer values for use in a digital imaging application is:

| Array (6), Recovered Luminance Data | | | | | | | |
|---|---|---|---|---|---|---|---|
| 101 | 99 | 97 | 97 | 101 | 108 | 116 | 121 |
| 104 | 102 | 100 | 100 | 105 | 112 | 120 | 125 |
| 107 | 105 | 103 | 104 | 108 | 116 | 125 | 130 |
| 106 | 104 | 104 | 104 | 109 | 118 | 127 | 132 |
| 105 | 103 | 102 | 104 | 110 | 119 | 128 | 134 |
| 107 | 106 | 106 | 108 | 114 | 124 | 133 | 139 |
| 115 | 114 | 114 | 116 | 123 | 133 | 143 | 149 |
| 122 | 121 | 121 | 124 | 131 | 141 | 151 | 157 |

Recovered array (6) approximates array (1), but is not an exact duplicate. The quantization step has introduced distortion into the recovered image.

In general, smaller quantization matrix values will result in higher quality in the recovered image because the DCT coefficients are more finely quantized by the smaller quantization values. However, the smaller quantization values will also generally result in a larger size for the compressed image, because fewer zeros will be present in the array of quantized coefficients.

As was noted earlier, the DCT coefficients represent the relative contributions to the image of various spatial frequencies in the image content. Generally, the upper left DCT coefficients represent low frequency contributions, and progressively higher frequency contributions are represented by coefficients progressively lower and to the right in the DCT coefficient array for a particular data block.

Different digital images may have differing spatial frequency content. For example, a digital photograph of a fog-enshrouded valley may be dominated by low-frequency content, while a cityscape containing many sharp edges and geometric shapes may contain significantly more high-frequency content. A hard-coded quantization array may quantize the coefficients of the low-frequency image more finely than is really necessary to adequately reproduce the image after compression, while it may quantize the coefficients of the high-frequency image so coarsely that significant and objectionable distortion is introduced into the image by the compression process.

A higher quality setting that more finely quantizes the DCT coefficients could avoid the objectionable distortion, but a user of the device may not realize the distortion has occurred until it is too late to make an alternate selection. Even if a higher quality setting is used, the compressed image file that is generated may be larger than necessary to store the image with acceptable quality. This is because the hard coded quantization table may quantize some coefficients, such as those representing spatial content frequencies that are not significantly present in the image, more finely than necessary, resulting in a compressed image file that is larger than necessary.

In a method in accordance with an example embodiment of the invention, a quantization table is constructed that is adapted to the frequency content of the image being compressed.

Figure 2:
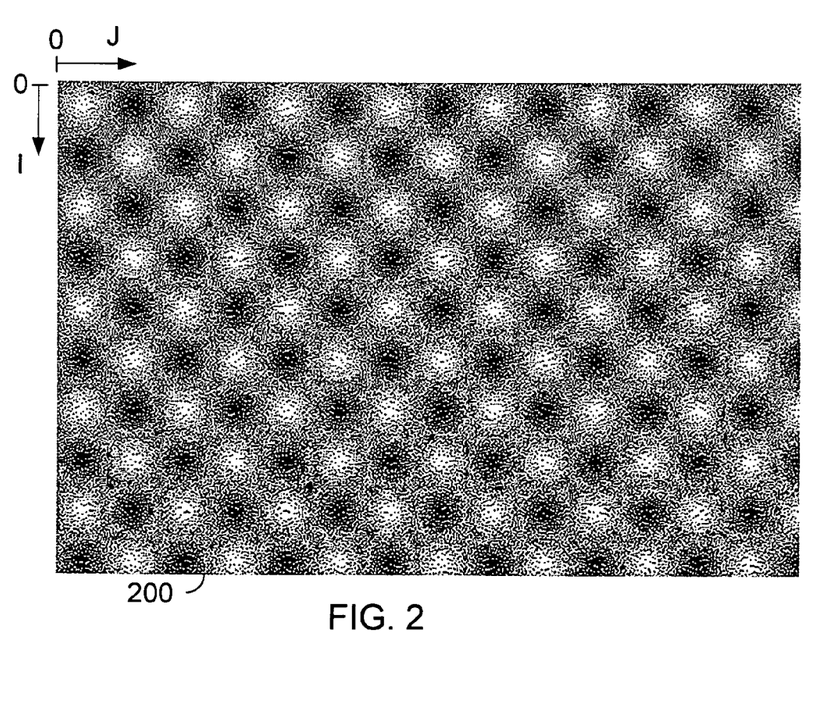
FIG. 2 depicts luminance information for an example digital image having content of relatively low spatial frequency.

FIG. 2 depicts luminance information for an example digital image 200 having content of a relatively low spatial frequency. In FIG. 2, a lighter region corresponds to a higher luminance in digital image 200. Example digital image 200 is 2448 pixels wide and 1632 pixels high. One of skill in the art will recognize that other image sizes may be accommodated. Luminance values in example image 200 change relatively slowly as the image is traversed.

Figure 3:
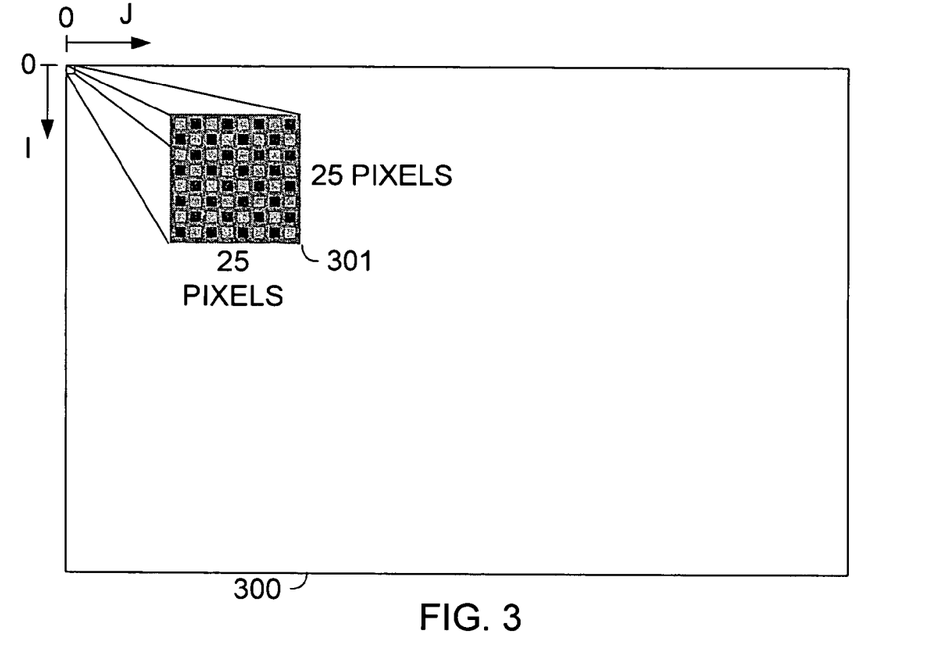
FIG. 3 depicts luminance information for an example digital image having content of relatively high spatial frequency.

FIG. 3 depicts luminance information for an example digital image 300 having content of a relatively high spatial frequency. Example digital image 300 is also 2448 by 1632 pixels. Only a 25×25 pixel region 301 is shown in detail, to demonstrate that the luminance values in example image 300 change relatively rapidly as the image is traversed. The pattern illustrated in region 301 is repeated throughout image 300.

Figure 4:
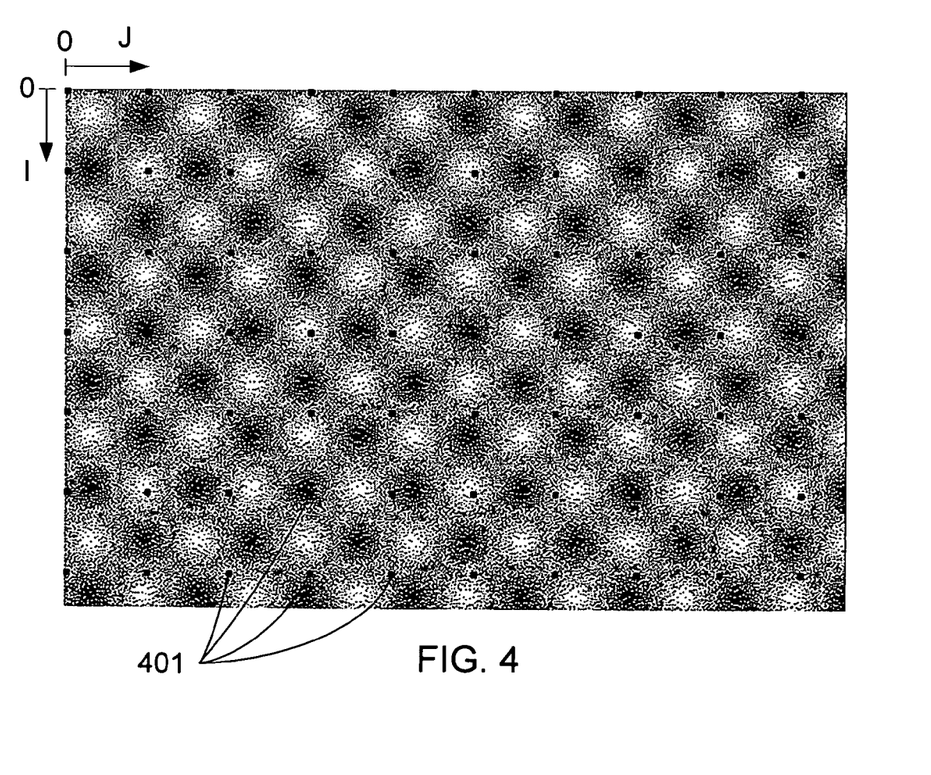
FIG. 4 shows a sampling of macroblocks used to characterize the frequency content of the digital image of FIG. 2, in accordance with an example embodiment of the invention

In a first step in a method in accordance with an example embodiment of the invention, the spatial frequency content of the image to be compressed is characterized. It has been noted that the variability of the DCT coefficients resulting from performing the DCT on each data block in an image is a useful characterization of the spatial frequency content of a digital image. One practical measure of variability is the variance of the DCT coefficients. In a method in accordance with an example embodiment of the invention, a relatively sparse sampling of the data blocks in an image is used to characterize the spatial frequency content of the image. FIG. 4 shows a sampling of macroblocks 401 used to characterize the frequency content of example digital image 200. In this example, every $16^{th}$ macroblock in the horizontal dimension of the image is sampled on every $16^{th}$ line of macroblocks in the image. That is, approximately one of every 256 macroblocks in the image is sampled. In this example implementation, each 16×16 pixel macroblock 401 comprises six 8×8 data blocks, four data blocks of luminance information and two data blocks of chrominance information. Any macroblock that falls on an image edge and would require padding with temporary data is not used in this example implementation.

A DCT is performed on each data block of sampled image information. In characterizing example image 200 according to FIG. 4, 70 macroblocks are used, comprising 280 data blocks of luminance information, 70 data blocks of Cb chrominance information, and 70 data blocks of Cr chrominance information. Each DCT results in 64 DCT coefficients. Thus, in this example, 280 occurrences are computed for each of the 64 DCT coefficients representing different spatial frequencies in the luminance content of the image, 70 occurrences are computed for each of the 64 DCT coefficients representing different spatial frequencies in the Cr chrominance content of the image, and 70 occurrences are computed for each of the 64 DCT coefficients representing different spatial frequencies in the Cb chrominance content of the image. Other numbers of data blocks may be used with different image compression formats.

Figure 5:
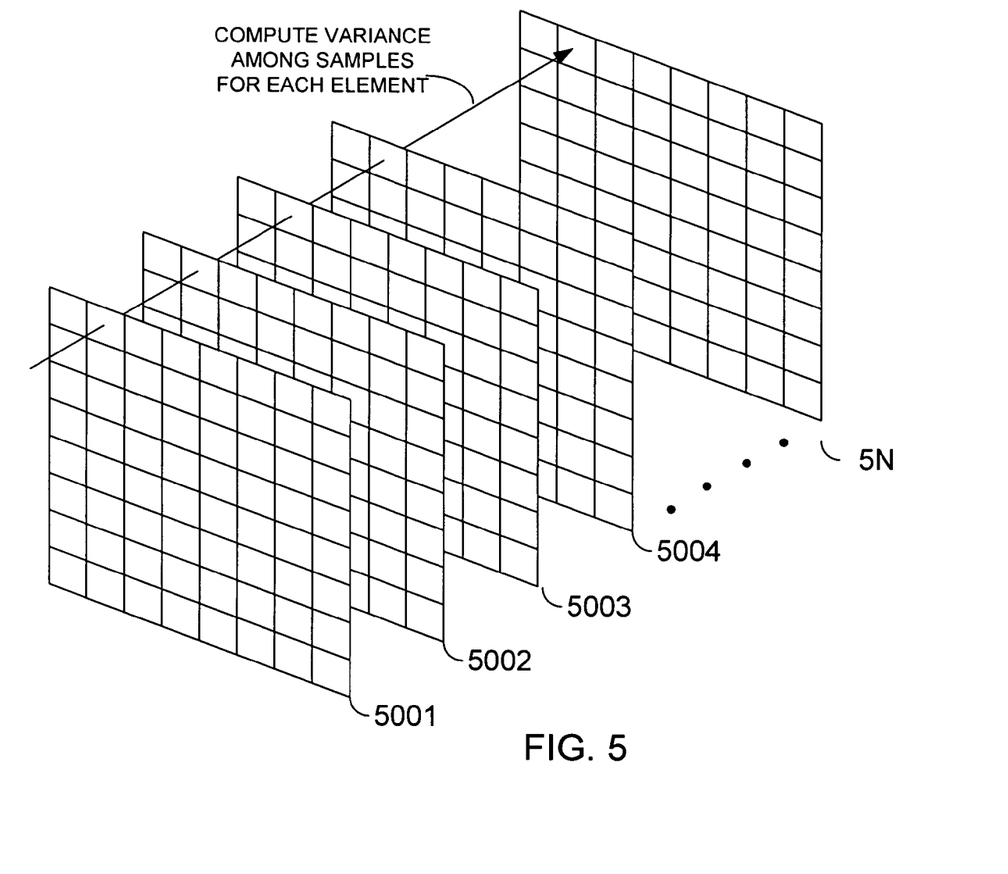
FIG. 5 illustrates a variance computation in accordance with an example embodiment of the invention.

In accordance with an example embodiment of the invention a variance is computed or approximated for each of the 64 DCT coefficients for each of the luminance and chrominance channels of the image. The variance or estimate of variance serves as a measure of the variability of the coefficients. FIG. 5 illustrates which values are used for the variance computation. Each of arrays 5001 . . . 5N is an 8×8 array of DCT coefficients computed from one of the sample blocks of the image being compressed. In the example sampling of FIG. 4, when 4:2:0 compression is used, N=280 for the luminance channel, and N=70 for each chrominance channel. The variance for each element of the DCT array is an indication of the contribution of spatial frequencies represented by that element to the overall image.

The variance of the samples of each DCT array element may be computed according to one of the "exact" formulae $$\sigma_i^2 = \frac{\sum_{k=1}^{N}(c_k - \overline{c})^2}{N-1} \text{ or } \sigma_i^2 = \frac{\sum_{k=1}^{N}(c_k - \overline{c})^2}{N}$$

where $c_k$ is one sample of element i of the DCT coefficient array, and $\overline{c}$ is the average of the samples for element i of the DCT coefficient array. Alternatively, because $\overline{c}$ is often nearly zero, it may be assumed to be zero and the variance approximated according to one of the approximate formulae $$\sigma_i^2 = \frac{\sum_{k=1}^{N} c_k^2}{N-1} \text{ or } \sigma_i^2 = \frac{\sum_{k=1}^{N} c_k^2}{N}.$$

Other measures of variability may be used. For example, the numerator of any of the above variance formulas could be used as a measure of variability.

The use of the variance for characterizing the spatial frequency content of an image is exemplified as follows. The luminance information (Y) for each pixel of image 200 was generated according to the formula $Y=\sin(2\pi If)\times\sin(2\pi Jf)\times 125+128$ using f=0.003 and where I and J are the vertical and horizontal pixel coordinates of a particular pixel in the image. The DCT coefficient variances computed from 280 sample blocks according to the first exact variance formula are:

| Array (7), Luminance DCT Coefficient Variances, Image 200 | | | | | | | |
|---|---|---|---|---|---|---|---|
| 214429.26 | 469.47 | .19 | 5.03 | .10 | .58 | .08 | .10 |
| 443.76 | 1.03 | .08 | .09 | .10 | .07 | .08 | .09 |
| .19 | .08 | .09 | .10 | .08 | .06 | .08 | .11 |
| 4.82 | .10 | .11 | .07 | .07 | .07 | .07 | .11 |
| .10 | .10 | .08 | .07 | .08 | .07 | .09 | .08 |
| .57 | .06 | .07 | .08 | .07 | .10 | .09 | .09 |
| .08 | .09 | .07 | .07 | .09 | .09 | .09 | .07 |
| .10 | .09 | .11 | .10 | .08 | .10 | .07 | .10 |

In array (7), the variance of the DC coefficient in the upper left corner of the array, is a relatively large value, while the magnitudes of the values drop dramatically toward the variances representing higher frequency spatial content in the image. This indicates that the content of example image 200 is of relatively low spatial frequency.

By contrast, the luminance information (Y) for each pixel of image 300 was generated according to the formula $Y=\sin(2\pi If)\times\sin(2\pi Jf)\times 125+128$ using f=⅙. The DCT coefficient variances computed from 280 sample blocks according to the first exact variance formula are:

Array (8) has more relatively large entries than array (7), and many of those entries are in array elements corresponding to relatively high spatial frequency image content. This indicates that example image 300 has more high frequency content than example image 200 has. A similar array of DCT coefficient variances may be computed for each of the Cr and Cb chrominance channels of the image to be compressed.

In a second step in accordance with an example embodiment of the invention, a quantization table is constructed based on the characterization of the spatial frequency content of the image to be compressed. This step may be accomplished using "bit allocation". Bit allocation is known in the art. One example bit allocation technique proceeds according to the formulas:

$$\rho^2 = \left(\prod_{i=1}^{64} \sigma_i^2\right)^{1/64}$$

$$temp_i = \overline{q} + \frac{1}{2}\log_2 \frac{\sigma_i^2}{\rho^2}$$

$$q_i = \frac{8 \times 27}{(2 \times temp_i - 1)}$$

The quantity $\rho^2$ is computed once for each channel of the image, while the quantity $q_i$ is computed (using $temp_i$) for each element of each quantization table. In accordance with an example embodiment of the invention, a separate quantization table is computed for each channel Y, Cr, and Cb of the image, using the array of DCT coefficient variances computed for the appropriate channel.

The quantity $\overline{q}$ is chosen empirically by compressing and reconstituting a set of images using various values of $\overline{q}$ and then choosing a value for $\overline{q}$ that gives a desired image quality level for a particular use. For example, in designing a camera with "1-star", "2-star", and "3 star" image quality settings, a camera designer may select a value for $\overline{q}$ for each quality setting so that the settings are distinguishable and provide meaningful variation in file size. A different value for $\overline{q}$ may be used for each channel Y, Cr, and Cb of the image. By way of example, the quantization matrix computed according to the above formulas for the luminance channel information of image 200, using a value of $\overline{q}=9$ is

| Array (8), Luminance DCT Coefficient Variances, Image 300 | | | | | | | |
|---|---|---|---|---|---|---|---|
| 487.14 | 480.45 | 4846.87 | 4507.78 | 487.14 | 35.55 | 24.48 | 1.68 |
| 501.57 | 494.67 | 4990.53 | 4641.12 | 501.57 | 36.60 | 25.21 | 1.73 |
| 4846.87 | 4780.40 | 48225.16 | 44851.32 | 4846.87 | 353.73 | 243.57 | 16.76 |
| 4705.93 | 4641.12 | 46822.81 | 43544.56 | 4705.93 | 343.42 | 236.48 | 16.27 |
| 487.14 | 480.45 | 4846.87 | 4507.78 | 487.14 | 35.55 | 24.48 | 1.68 |
| 37.11 | 36.60 | 369.28 | 343.42 | 37.11 | 2.71 | 1.87 | .13 |
| 24.48 | 24.14 | 243.57 | 226.53 | 24.48 | 1.79 | 1.23 | .08 |
| 1.76 | 1.73 | 17.50 | 16.27 | 1.76 | .13 | .09 | .01 |

Array (9), Adaptive Luminance Quantization Table, Image 200

| 6  | 8  | 13 | 10 | 13 | 12 | 14 | 13 |
|----|----|----|----|----|----|----|----|
| 8  | 11 | 14 | 13 | 13 | 14 | 14 | 14 |
| 13 | 14 | 13 | 13 | 14 | 14 | 14 | 13 |
| 10 | 13 | 13 | 14 | 14 | 14 | 14 | 13 |
| 13 | 13 | 14 | 14 | 14 | 14 | 14 | 14 |
| 12 | 14 | 14 | 14 | 14 | 13 | 14 | 14 |
| 14 | 14 | 14 | 14 | 14 | 13 | 13 | 14 |
| 13 | 14 | 13 | 13 | 14 | 13 | 14 | 13 |

The smallest values in the table are the quantization coefficient for the DC coefficient and two values adjacent to it. These are the coefficients corresponding to low spatial frequency content in the image. Using this table to quantize the DCT coefficients for the luminance information of image 200 will quantize the low spatial frequency content more finely than higher spatial frequency content. The method has assigned quantizing values in a generally inverse relation to the size of the corresponding DCT coefficient variances. That is, those table elements corresponding to spatial frequencies with large DCT coefficient variability have generally received relatively small quantizing values, and table elements corresponding to spatial frequencies with small DCT coefficient variability have generally received relatively large quantizing values.

By contrast, the quantization matrix computed according to the above formulas for the luminance channel information of image 300, also using a value of $\bar{q}=9$ is Array (10), Adaptive Luminance Quantization Table, Image 300

| 11 | 11 | 10 | 10 | 11 | 14 | 14 | 19 |
|----|----|----|----|----|----|----|----|
| 11 | 11 | 9  | 10 | 11 | 14 | 14 | 19 |
| 10 | 10 | 8  | 8  | 10 | 11 | 12 | 15 |
| 10 | 10 | 8  | 8  | 10 | 11 | 12 | 15 |
| 11 | 11 | 10 | 10 | 11 | 14 | 14 | 19 |
| 14 | 14 | 11 | 11 | 14 | 18 | 19 | 29 |
| 14 | 14 | 12 | 12 | 14 | 19 | 20 | 31 |
| 19 | 19 | 15 | 15 | 19 | 29 | 31 | 69 |

The smallest values in array (10) are in elements corresponding to higher spatial frequency content than the smallest values in array (9). These are elements that had high variances as shown in array (8). The method has assigned quantizing values in a generally inverse relation to the size of the DCT coefficient variances, and has adapted the quantization tables to the spatial frequency content of the image being compressed.

Figure 6:
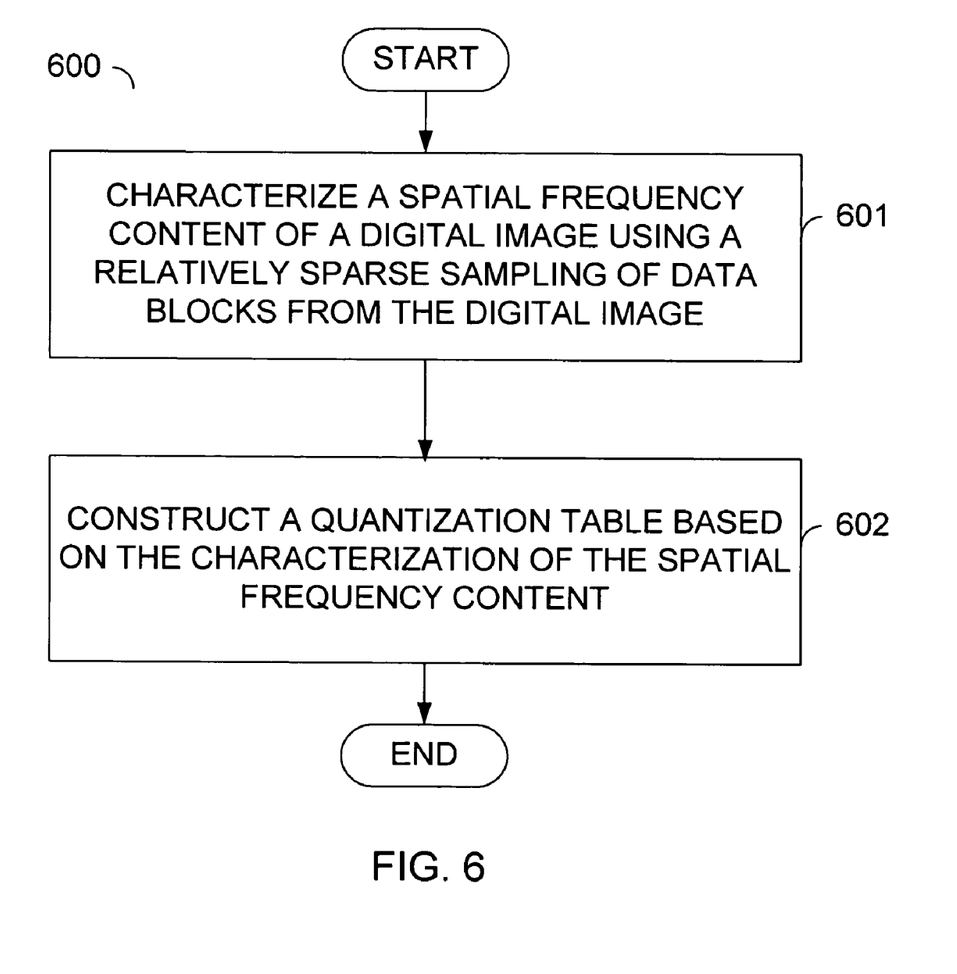
FIG. 6 depicts a flowchart of a method in accordance with an example embodiment of the invention.

FIG. 6 depicts a flowchart 600 of a method in accordance with an example embodiment of the invention. In step 601, a spatial frequency content of a digital image is characterized using a relatively sparse sampling of data blocks from the digital image. In step 602, a quantization table is constructed based on the characterization of the spatial frequency content.

Figure 7:
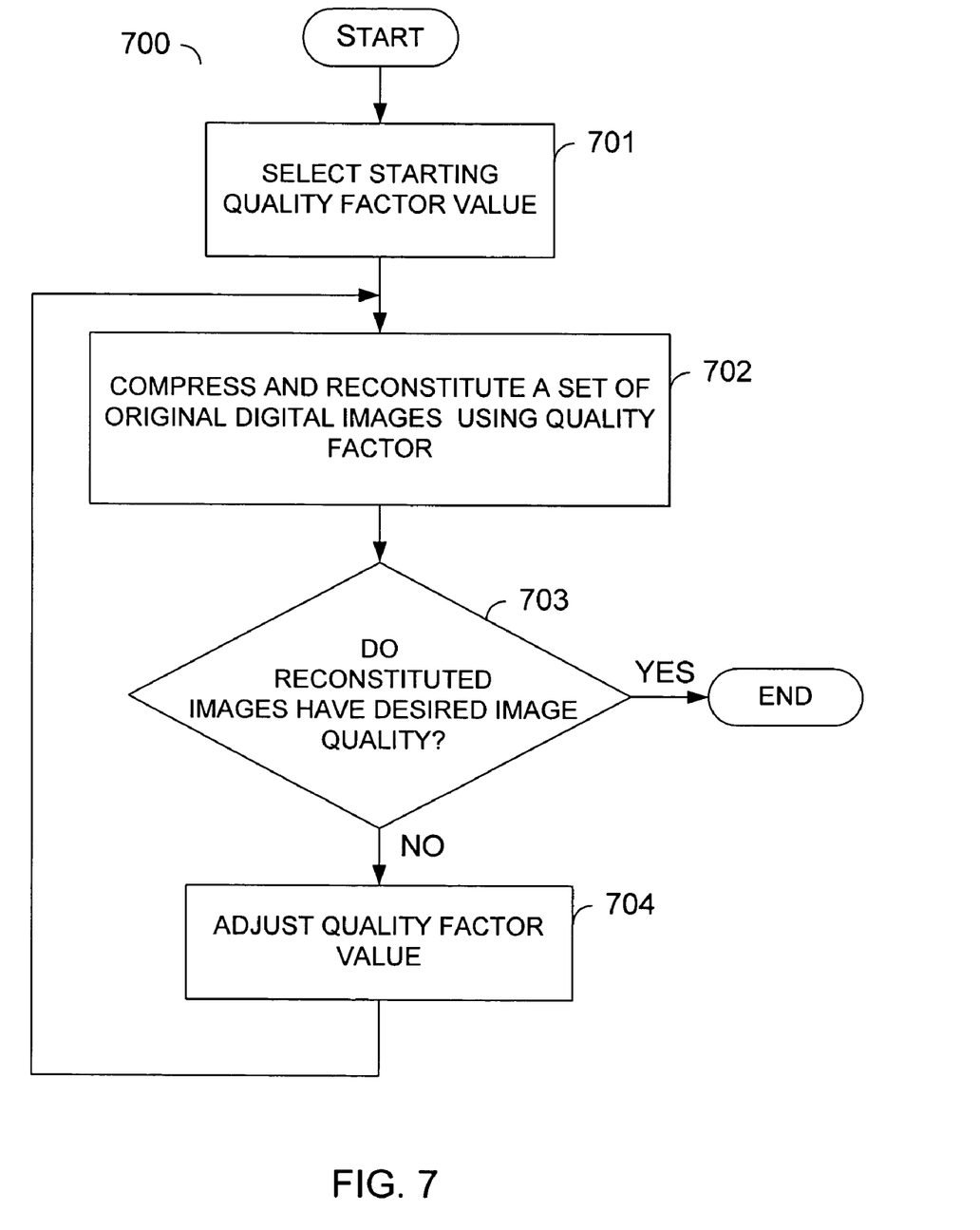
FIG. 7 depicts a flowchart of a method in accordance with another example embodiment of the invention for selecting suitable values for a quality factor.

As has been previously mentioned, suitable values for $\bar{q}$ are chosen empirically. The quantity $\bar{q}$ may be called a quality factor. FIG. 7 depicts a flowchart of a method 700 in accordance with another example embodiment of the invention for selecting suitable values for the quality factor $\bar{q}$. At step 701, a starting value is selected for the quality factor. At step 702, a set of original digital images having a variety of content characteristics is compressed using the quality factor and then reconstituted. At step 703, the reconstituted images are tested to see if they have the desired image quality. The test may be performed visually. If the reconstituted images have the desired image quality, a suitable value for the quality factor has been found, and the method terminates. If not, the quality factor value is adjusted in step 704 and control passes again to step 702. Upon each iteration, the same "original" set of digital images is compressed and reconstituted. That is, the reconstituted images are not themselves compressed again. The method may be repeated for various image channels and image quality settings.

In one example application using digital images obtained using a camera having an electronic array light sensor comprising approximately four megapixels, suitable values for $\bar{q}$ for the various quality settings and image channels have been found to be:

Example Table of Suitable $\bar{q}$ Values

| Channel | Image Quality Setting | | |
|---------|--------|--------|--------|
|         | 3-star | 2-star | 1-star |
| Y       | 28     | 14     | 8      |
| Cb      | 24     | 9      | 6      |
| Cr      | 20     | 7      | 5      |

Figure 8:
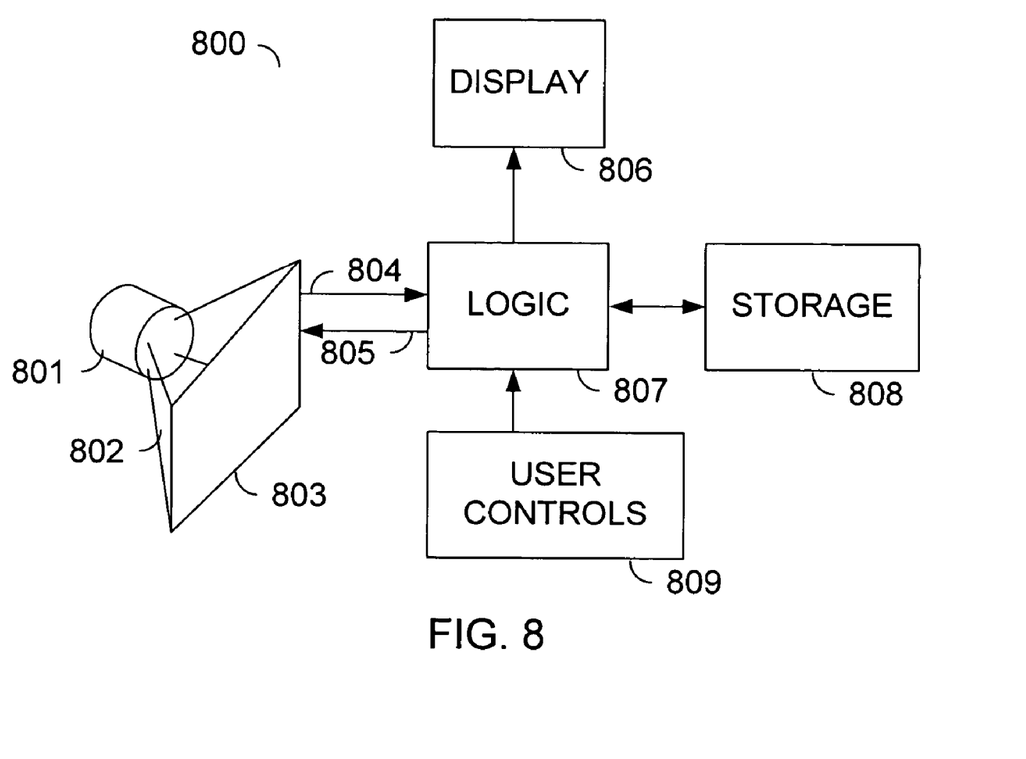
FIG. 8 depicts a block diagram of a digital camera in accordance with another example embodiment of the invention.

FIG. 8 depicts a block diagram of a digital camera 800 in accordance with another example embodiment of the invention. In camera 800, a lens 801 collects light from a scene and redirects it 802 to form an image on an electronic array light sensor 803. Electronic array light sensor 803 may be, for example, a charge coupled device sensor (CCD) or another kind of sensor. Image signals representing the intensity of light falling on various pixels of sensor 803 are sent to logic 807. Logic 807 may send control signals 805 to sensor 803. Logic 807 may comprise circuitry for converting image signals 804 to digital values, computational logic, a microprocessor, and digital signal processor, memory, dedicated logic, or a combination of these or other components. A user of the camera may direct the operation of the camera through user controls 809, and camera 800 may display digital images on display 806. Storage 808 may comprise random access memory (RAM), read only memory (ROM), flash memory or another kind of nonvolatile memory, or a combination of these or other kinds of computer-readable storage media. Information stored in storage 808 may comprise digital image files, configuration information, or instructions for logic 807. Instructions for logic 807 may comprise a computer program that implements a method in accordance with an embodiment of the invention.

In another embodiment, a method according to an example embodiment of the invention may be performed by a computer, the computer executing instructions stored on a computer-readable storage medium. The computer-readable storage medium may be a floppy disk, a compact disk read only memory (CD-ROM), a digital versatile disk (DVD), read only memory (ROM), random access memory (RAM), flash memory, or another kind of computer-readable memory.

The invention claimed is:

1. A processor implemented method to compress a digital image, comprising:
   accessing a digital image representing by a plurality of pixels generated by a sensor device;
   generating at least one variance array which characterizes a spatial frequency content of the digital image using subset of samples of data blocks from the digital image; and constructing at least one quantization table which is a numerical representation of characteristics of the digital image based using the variance array which characterizes the spatial frequency content;

presenting the digital image on a display device coupled to the processor; and storing the at least one quantization table in a memory module.

2. The method of claim 1, wherein accessing a digital image representing by a plurality of pixels generated by a sensor device comprises accessing the output of a charge coupled device.

3. The method of claim 1, wherein generating at least one variance array comprises generating a variance array which characterizes spatial frequency content of at least one of chrominance information and luminance information.

4. The method of claim 1, wherein constructing at least one quantization table comprises constructing a quantization table for at least one of chrominance information and luminance information.

5. The method of claim 1, wherein the subset of samples of data blocks comprise luminance information data blocks.

6. The method of claim 1, wherein the subset of samples of data blocks comprise chrominance information data blocks.

7. The method of claim 1, wherein the subset of samples of data blocks comprises both luminance information data blocks and chrominance information data blocks.

8. The method of claim 1, wherein constructing at least one quantization table comprises applying a quality factor to the quantization table.

9. The method of claim 7, wherein the subset of samples of data blocks comprises two times as many luminance information data blocks as chrominance information data blocks.

10. The method of claim 1, wherein generating at least one variance array further comprises:

performing a discrete cosine transform on each data block in the sample; and computing a variability measure of each discrete cosine transform coefficient.

11. The method of claim 10, wherein computing a variability measure comprises computing a variance.

12. The method of claim 10, wherein computing a variability measure comprises approximating a variance.

13. The method of claim 10, further comprising computing a separate variability measure for each channel of the digital image.

14. The method of claim 10, wherein constructing a quantization table further comprises assigning quantizing values to each quantization table element in generally inverse relation to the variability of the corresponding discrete cosine transform coefficient.

15. The method of claim 1, wherein the digital image is stored in JPEG format.

16. A digital imaging device, comprising a logic unit which:

accesses a digital image representing by a plurality of pixels generated by a sensor device;

generates at least one variance array which characterizes a spatial frequency content of the digital image using subset of samples of data blocks from the digital image;

constructs at least one quantization table which is a numerical representation of characteristics of the digital image using the variance array which characterizes the spatial frequency content presents the digital image on a display device coupled to the processor; and stores the at least one quantization table in a memory module.

17. The digital imaging device of claim 16, wherein the digital imaging device is a digital camera.

18. The digital imaging device of claim 16, further configured to:

performs a discrete cosine transform on each data block in the sample; and computes a variability measure of each discrete cosine transform coefficient.

19. The digital imaging device of claim 18, wherein the variability measure is computed by computing a variance.

20. The digital imaging device of claim 18, wherein the variability measure is computed by estimating a variance.

21. The digital imaging device of claim 18, wherein the quantization table is constructed such that relatively low values are assigned to table entries corresponding to discrete cosine transform coefficients with relatively high variability, and relatively high values are assigned to table entries corresponding to discrete cosine transform coefficients with relatively low variability.

22. The digital imaging device of claim 16, wherein the quantization table is constructed using a bit allocation method.

23. The digital imaging device of claim 22, wherein the bit allocation method utilizes an image quality factor that has been selected such that images compressed by the device and then reconstituted have a desired image quality.

24. The digital imaging device of claim 16, wherein the subset of samples of data blocks comprises fewer than one percent of the data blocks in the digital image.

25. The digital imaging device of claim 16, wherein the subset of samples of data blocks comprises approximately one of every 256 data blocks in the digital image.

26. A computer-readable storage medium storing instructions for performing the following method:

accessing a digital image representing by a plurality of pixels generated by a sensor device;

generating at least one variance array which characterizes a spatial frequency content of the digital image using a subset of samples of data blocks from the digital image; and constructing at least one quantization table which is a numerical representation of characteristics of the digital image based using the variance array which characterizes the spatial frequency content;

presenting the digital image on a display device coupled to the processor; and storing the at least one quantization table in a memory module.

27. The computer-readable storage medium of claim 26, wherein accessing a digital image representing by a plurality of pixels generated by a sensor device comprises accessing the output of a charge coupled device.

28. The computer-readable storage medium of claim 26, wherein generating at least one variance array comprises generating a variance array which characterizes spatial frequency content of at least one of chrominance information and luminance information.

29. The computer-readable storage medium of claim 26, wherein the method further comprises:

performing a discrete cosine transform on each data block in the sample; and computing a variability measure of each discrete cosine transform coefficient.

30. The computer-readable storage medium of claim 29, wherein constructing the quantization table further comprises:

assigning a first quantizing value to a first table element corresponding to a first discrete cosine transform coefficient having a first variability; and assigning a second quantizing value to a second table element corresponding to a second discrete cosine transform coefficient having a second variability, the first quantizing value being smaller than the second, and the first variability being larger than the second.

31. The computer-readable storage medium of claim 29, wherein computing a variability measure comprises computing a variance.

32. The computer-readable storage medium of claim 29, wherein computing a variability measure comprises estimating a variance.

33. The computer-readable medium of claim 26, wherein the medium is a floppy disk.

34. The computer-readable medium of claim 26, wherein the medium is a flash memory.

35. The computer-readable medium of claim 26, wherein the medium is a compact disk read only memory (CD-ROM).

36. The computer-readable medium of claim 26, wherein the medium is a digital versatile disk (DVD).

37. The computer-readable medium of claim 26, wherein the medium is random access memory (RAM).

* * * * *

UNITED STATES PATENT AND TRADEMARK OFFICE
CERTIFICATE OF CORRECTION

PATENT NO. : 7,580,579 B2 Page 1 of 1
APPLICATION NO. : 11/018206
DATED : August 25, 2009
INVENTOR(S) : Yu-Wei Wang et al.

It is certified that error appears in the above-identified patent and that said Letters Patent is hereby corrected as shown below:

In column 12, line 42, in Claim 26, after "using" delete "a".

Signed and Sealed this

Sixth Day of July, 2010

David J. Kappos
*Director of the United States Patent and Trademark Office*